US009263838B1

(12) United States Patent
Zhang et al.

(10) Patent No.: US 9,263,838 B1
(45) Date of Patent: Feb. 16, 2016

(54) SLIP RING FOR HIGH SPEED DATA TRANSMISSION

(71) Applicant: Princetel Inc., Hamilton, NJ (US)

(72) Inventors: Hong Zhang, Hamilton, NJ (US); Jingrong Shen, Hamilton, NJ (US); Joe Ritacco, Hamilton, NJ (US); Boying B. Zhang, Hamilton, NJ (US)

(73) Assignee: PRINCETEL, INC., Hamilton, NJ (US)

( * ) Notice: Subject to any disclaimer, the term of this patent is extended or adjusted under 35 U.S.C. 154(b) by 0 days.

(21) Appl. No.: 14/698,434

(22) Filed: Apr. 28, 2015

(51) Int. Cl.
*H01R 39/18* (2006.01)
*H01R 39/08* (2006.01)
*H02K 13/00* (2006.01)

(52) U.S. Cl.
CPC ................ *H01R 39/18* (2013.01); *H01R 39/08* (2013.01); *H02K 13/003* (2013.01)

(58) Field of Classification Search
CPC ........................................................ H01R 39/18
See application file for complete search history.

(56) References Cited

U.S. PATENT DOCUMENTS

| | | | | |
|---|---|---|---|---|
| 4,529,899 A * | 7/1985 | Mabuchi | H01R 39/18 310/228 |
| 6,007,344 A * | 12/1999 | Corrunker | B60Q 1/0082 439/22 |
| 6,169,348 B1 * | 1/2001 | Won | H01R 39/18 200/11 DA |
| 2015/0024610 A1 * | 1/2015 | Pollner | H01R 39/643 439/28 |

* cited by examiner

*Primary Examiner* — James Harvey

(57) ABSTRACT

The current invention is regarding a slip ring for transmitting high speed electrical signal across a rotating interface, especially for transmitting Ethernet data. It consists of sandwich assembly with multiple conducting plates individually sandwiched by multiple insulating spacers and a brush block assembly with multiple conducting brushes. The input Ethernet cable is attached on said sandwich assembly and the wires from input cable can be individually soldered into the central hole of each conducting plate (The wires are always off-centered in prior art). The output Ethernet cable is soldered on said brush block. Said brush block assembly and said sandwich assembly are rotatable relative to each other through bearings to form a rotational interface. As a result, high speed electrical signal can be transmitted across the rotating interface without suffering from phase shift and data distortion as in prior arts due to unequal path lengths.

9 Claims, 3 Drawing Sheets

SECTION A-A
SCALE 2 : 1

SLIP RING FOR HIGH SPEED DATA TRANSMISSION

BACKGROUND OF THE INVENTION

The present invention relates generally to an electrical slip ring, and more particularly to an apparatus having a plurality of conductive plates and conductive fiber brush bundles to transfer electrical signal(s) between relatively rotatable objects.

It is well known that electrical slip rings are electromechanical devices that consist of rotational (rotors) and stationary (stators) members. They allow the transmission of electrical signals and power from their rotors to stators or vise verse.

A conventional electrical slip ring consists of conductive rings mounted on a rotor and insulated from it. Fixed brushes run in contact with the rings, rubbing against the peripheral surfaces of the rings, transferring electrical power or signals to the stator.

Electrical rotary joints, or electrical slip rings are electromechanical devices that consist of rotational and stationary members. They allow the transmission of electrical signals and power from their rotors to stators or vise verse. A conventional electrical slip ring consists of conductive rings mounted on a rotational member, insulated from it, and commuters fixed with a stationary member. Fixed brushes from commuters run in contact with the rings, rubbing against the peripheral surfaces of the rings, transferring electrical power or signals between rotational member and stationary member.

In computer networking, Gigabit Ethernet (GbE or 1 GigE) is a term describing various technologies for transmitting Ethernet frames at a rate of a gigabit per second (1,000,000,000 bits per second), as defined by the IEEE 802.3-2008 standard. 1000BASE-T (also known as IEEE 802.3ab) is a standard for Gigabit Ethernet over copper wiring. Each 1000BASE-*T* network segment can be a maximum length of 100 meters (330 feet), and must use Category 5 cable or better (including Cat 5e and Cat 6).

Category 5 cable (cat 5) is a twisted pair cable for carrying signals. This type of cable is used in structured cabling for computer networks such as Ethernet. To support Gigabit Ethernet, a higher performance version of cat 5, enhanced cat 5 or cat 5e has been added to the standards. Cat 5e adds new performance requirements to permit higher speed network operation. The category 5e specification improves upon the category 5 specification by tightening some crosstalk specifications and introducing new crosstalk specifications that were not present in the original category 5 specification. The bandwidth of category 5 and 5e is the same—100 MHz.

Slip rings do a great job of transmitting electrical power. However, when used for data communications, high speed data stream as a series of multiple frequency pulses being transferred through the slip ring with unequal path lengths, would change the signal impedance beyond that tolerated by the data signal and can cause phase shift and distortion of the transition points resulting in the received data rise and fall times to have serious edge jitter, or serious amplitude distortions. The resultant distorted data waveforms stress the decision-making hardware to correctly detect the data versus the fixed frequency of the data clock. When this becomes large enough, data errors occur.

This process can occur within the frequency response bandwidth of the device.

SUMMARY OF THE INVENTION

The objective in the current invention is to reduce, or even eliminate the unequal path lengths in slip ring and design a new slip ring to transmit high speed data, especially Gigabit Ethernet signals.

DETAIL DESCRIPTION OF THE INVENTION

A detailed explanation of preferred embodiment in the present invention with reference to FIG. 1, FIG. 2, FIG. 3 and FIG. 4 is as follows.

Figure 1:
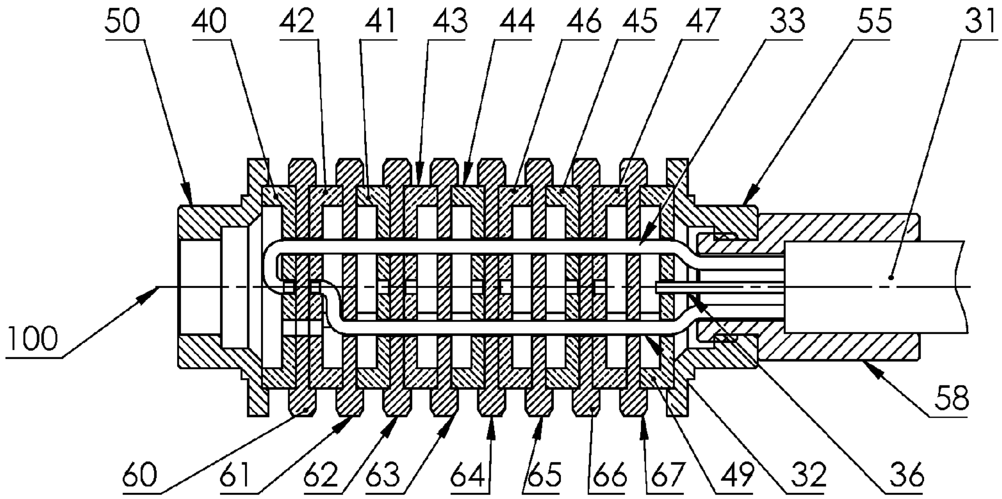
FIG. 1 shows the configuration of the ring assembly in the present invention.
Figure 1:
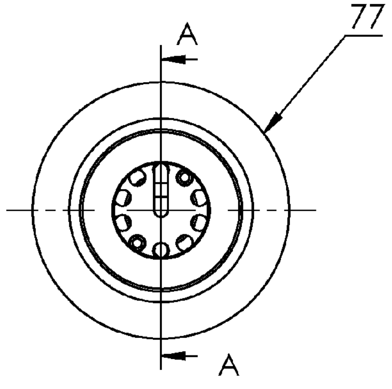

FIG. 1 shows the main configuration of the ring assembly 77 in the present invention. Said ring assembly 77 consists of Cat5 (or Cat6) cable 31, conducting plates 40~49, insulating spacers 60~67, bobbin 50 and 55, and cable holder 58. Said Cat5 (or Cat6) cable 31 has 4 twisted pair and 1 ground wire, so totally 9 wires. The typical twisted-pair wires are 32 and 33. The ground wire is 36. There are totally 9 plates and they divided into 4 groups for 4 twisted-pair wires. Ring 49 is for ground wire of said Cat5 (or Cat6) cable 31.

Figure 2:
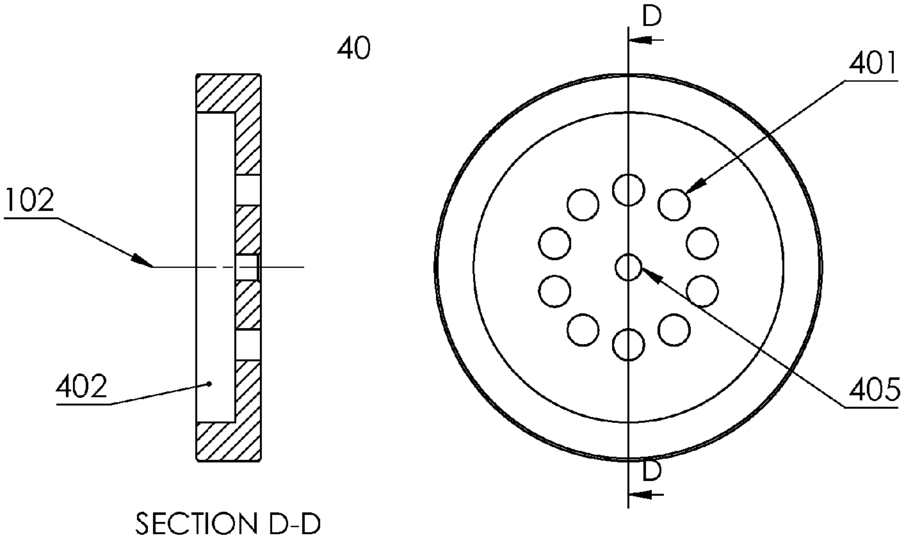
FIG. 2 is the detailed view of the ring in the present invention.

FIG. 2 is the detailed view of said conducting plate 40 (or one of 40~49), which is made of conducting materials. Said plate 40 has a round disk shape with a counter bore 402. The central hole 405 is concentrated with its rotating axis 102. Around its axis 102, there are at least 8 small holes 401 off-centered.

Figure 3:
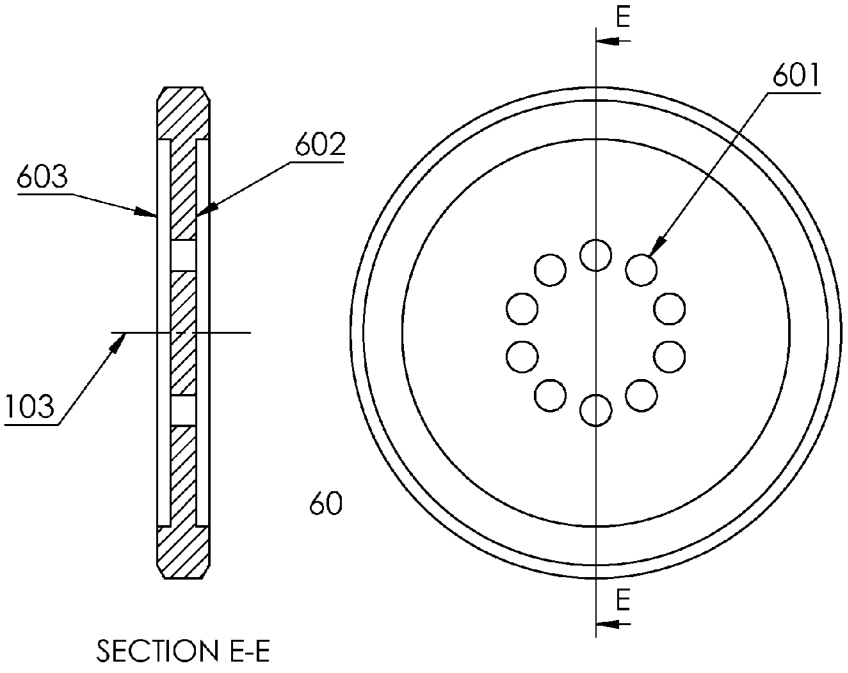
FIG. 3 is the detailed view of the insulating spacer in the present invention.

FIG. 3 is the detailed view of said insulating spacers 60 (or one of 60~67), which is made of insulating materials. Said spacer 60 has a round disk shape with two counter bores 602 and 603. Around its axis 103, there are at least 8 small holes 601 off-centered.

Back to FIG. 1, said 9 rings 40~49 are isolated by 8 said spacers 60~67 and said bobbin 50, 55 respectively. They are concentrated each other with the common axis 100. The outer diameter of said plate 40~49 would be fitted into said counter bore of said spacers and bobbins by epoxy, or other adhesives. Said twisted pair wires 32 and 33 would be soldered into said central holes of said plate 40 and 42 respectively. Said twisted pair wires 32 and 33 would pass through said off-centered small holes 401 on said plates and 601 on said spacers to access said central holes on said plates. Said ground wire 36 would be directly soldered into said central hole of ring 49.

Figure 4:
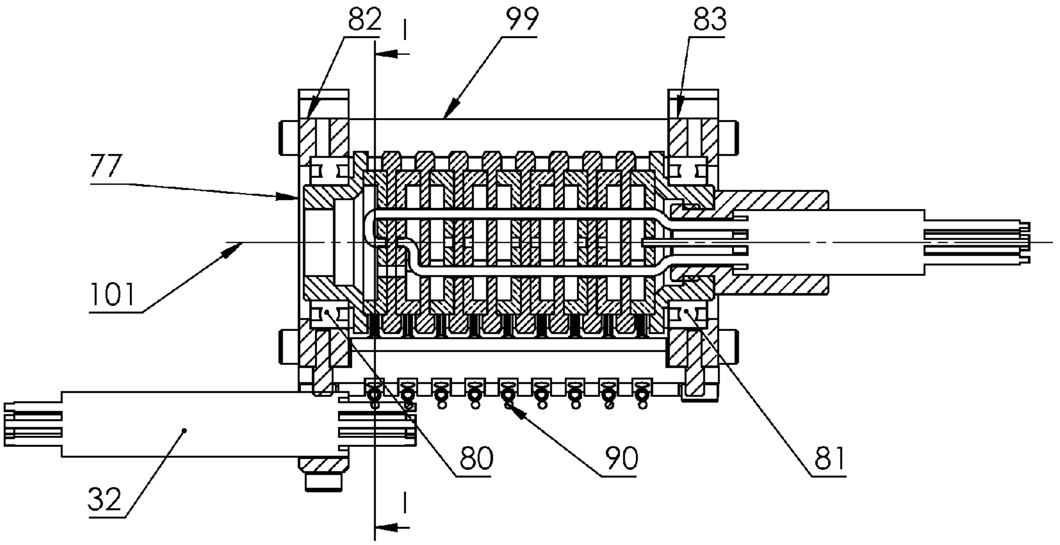
FIG. 4 illustrates the main embodiment of the slip ring in the present invention.
Figure 4:
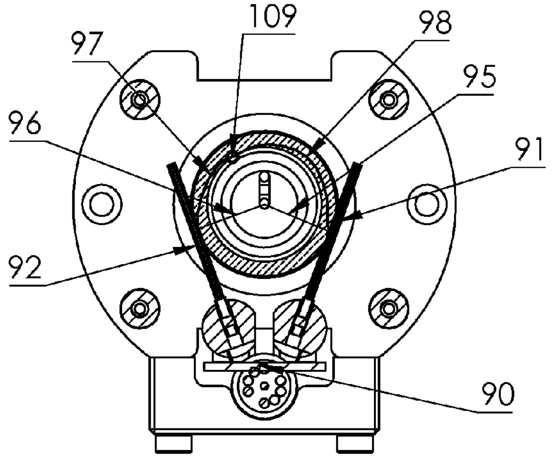

FIG. 4 illustrates the main embodiment of the slip ring in the present invention. Said slip ring includes said ring assembly 77, brush block assembly 90, ball bearing 80 and 81, stator plates 82 and 83, linkage 99, and cat5 (or cat6) cable 32. Said ring assembly 77 is rotatable relative to said stator plates 82 and 83 through ball bearing 80 and 81 abound the rotating axis 101. Said stator plates 82 and 83 are fixed each other by said linkage 99. Said brush block 90 has at least 9 brushes 91, or 92 to contact on the outer surfaces of said rings respectively to transmit the high speed signals to said cable 32, which is fixed on brush block 90.

Obviously, in the current invention, the transmission path length 95 and 96 for high speed signal are always almost equal because the location of wire soldering is on the center of said rings and the wire diameter of twisted-pair on cat5 (or cat6) cable is only about 1 mm. While in prior arts, in traditional slip rings, the wire soldering location 109 is always far from center of rings so as to lead to unequal path length 97 and 98.

We claim:

1. A slip ring for transmitting high speed electrical signal across a rotating interface consisting of:

a sandwich assembly with multiple sandwich items and an common geometrical axis;

said sandwich item containing two spacer plates, made of insulating material, with at least one conducting plate, made of conducting material, between them;

said sandwich assembly further including two bobbins, made of insulating material;

at least one brush block, made of insulating material;

said brush block containing multiple conducting brushes, or brush bundles, made of conducting material, capable of conducting electrical current;

a couple of bearings;

an input Ethernet cable, or other twisted pair cables with multiple conducting wires;

an output Ethernet cable, or other twisted pair cables with multiple conducting wires.

2. A slip ring for transmitting high speed electrical signal according to claim 1, wherein said conducting plate(s) having a round disk shape with an outer surface, a counter bore and central through hole concentrating with its geometrical axis, and further including multiple off-centered small holes.

3. A slip ring for transmitting high speed electrical signal according to claim 1, wherein said insulating spacer(s) having a round disk shape with two counter bores concentrating with its geometrical axis, and further including multiple off-centered small holes.

4. A slip ring for transmitting high speed electrical signal according to claim 1, wherein said bobbin having a round surface with a central through hole concentrating with its geometrical axis.

5. A slip ring for transmitting high speed electrical signal according to claim 1, wherein said sandwich item formed by said conducting plate fixing into one of said counter bore of said spacers by epoxy, or other adhesives with said off-centered small holes aligned each other.

6. A slip ring for transmitting high speed electrical signal according to claim 1, wherein said sandwich assembly formed by overlying said multiple sandwich items by epoxy, or other adhesives with said off-centered small holes aligned each other, and further formed by adding said bobbins on each side of said multiple sandwich items around said common geometrical axis by epoxy, or other adhesives.

7. A slip ring for transmitting high speed electrical signal according to claim 1, wherein said sandwich assembly further comprising said input Ethernet cable in said central hole on one of said bobbins, and said conducting wires from said input cable individually transmitting through said off-centered small holes to access one of said central holes on one of said conducting plates and being soldered into said central hole.

8. A slip ring for transmitting high speed electrical signal according to claim 1, wherein said brush block further including said output cable, and said conducting wires from said output cable being individually soldered with said brushes respectively.

9. A slip ring for transmitting high speed electrical signal according to claim 1, wherein said sandwich assembly being rotatable relatively to said brush block through said bearings around said common geometrical axis, and furthermore, said brushes individually contacting on said outer surface of said conducting plate respectively to transmit the high speed signals from said input cable to said output cable.

* * * * *